United States Patent
Shao et al.

(10) Patent No.: US 8,341,410 B2
(45) Date of Patent: Dec. 25, 2012

(54) EFFICIENT CERTIFIED EMAIL PROTOCOL

(75) Inventors: Jun Shao, Shanghai (CN); Bin Zhu, Edina, MN (US); Min Feng, Chengdu Sichuan (CN)

(73) Assignee: Microsoft Corporation, Redmond, WA (US)

( * ) Notice: Subject to any disclaimer, the term of this patent is extended or adjusted under 35 U.S.C. 154(b) by 918 days.

(21) Appl. No.: 11/868,872

(22) Filed: Oct. 8, 2007

(65) Prior Publication Data
US 2009/0094452 A1    Apr. 9, 2009

(51) Int. Cl.
H04L 29/06    (2006.01)
(52) U.S. Cl. .................. 713/171; 713/150; 380/255
(58) Field of Classification Search .............. 713/171
See application file for complete search history.

(56) References Cited

U.S. PATENT DOCUMENTS

| | | | |
|---|---|---|---|
| 5,638,446 A | 6/1997 | Rubin | |
| 5,799,086 A * | 8/1998 | Sudia | 705/76 |
| 6,141,750 A | 10/2000 | Micali | |
| 7,058,605 B2 | 6/2006 | Gupta | |
| 7,136,840 B2 | 11/2006 | Pinkas et al. | |
| 7,171,559 B1 | 1/2007 | Bao et al. | |
| 2002/0049601 A1 | 4/2002 | Asokan et al. | |
| 2002/0120465 A1 * | 8/2002 | Mori et al. | 705/1 |
| 2002/0129265 A1 * | 9/2002 | Watanabe | 713/200 |
| 2002/0138735 A1 | 9/2002 | Felt et al. | |
| 2003/0028495 A1 | 2/2003 | Pallante | |
| 2004/0073790 A1 * | 4/2004 | Ateniese et al. | 713/165 |
| 2005/0198170 A1 | 9/2005 | LeMay et al. | |
| 2006/0282675 A1 | 12/2006 | Yao | |
| 2007/0124584 A1 | 5/2007 | Gupta | |
| 2007/0157031 A1 * | 7/2007 | Sudhakar | 713/189 |

FOREIGN PATENT DOCUMENTS

JP    11191761 (A)    7/1999

OTHER PUBLICATIONS

Schneier, Applied Crytopgraphy, 1996, p. 38-40.*
Asokan, et al., "Asynchronous Protocols for Optimistic Fair Exchange", at <<http://citeseer.ist.psu.edu/cache/papers/cs/563/http:zSzzSzwww.zurich.ibm.comzSzTechnologyzSzSecurityzSzpublicationszSz 1998zSzASW98. pdf/asokan98 asynchronous. pdf>>, IEEE, 1998, pp. 2.
Asokan, "Optimistic Protocols for Fair Exchange", IBM Research Division, 1997, whole document, retrieved from the Internet at http://www.semper.org/sirene/publ/AsSW3_96FairX.IBMrep.pdf.
Kremer, et al., "Fair Multi-Party Non-Repudiation Protocols", available at leaset as early as Aug. 21, 2007, at <<http://www.ulb.ac.be/di/scsi/markowitch/publications/ijis03.pdf>>, pp. 25.

(Continued)

Primary Examiner — Edan Orgad
Assistant Examiner — Brian Olion
(74) Attorney, Agent, or Firm — Lee & Hayes, PLLC

(57) ABSTRACT

An exemplary optimistic protocol for a two-party transaction includes a setup sub-protocol that includes an authorized Diffie-Hellman key agreement, an exchange sub-protocol that includes sending a certificate from a sending party to a receiving party and sending a receipt from the receiving party to the sending party and a dispute sub-protocol that includes a dispute resolution mechanism for resolving disputes between the sending party and the receiving party due to sending of an invalid certificate, due to sending an invalid receipt, or due to abortion of the exchange sub-protocol. Other exemplary methods, systems, etc., are also disclosed.

20 Claims, 11 Drawing Sheets

OTHER PUBLICATIONS

Nenadic, et al., "Fair Certified Email Delivery", at <<http://delivery.acm.org/10.1145/970000/967985/p391-nenadic.pdf?key1=967985& key2=5443767811&coll=&d1=& CFID=151 51515& CFTOKEN= 6184618>>, ACM, 2004, pp. 391-396.

Pfitzmann, et al., "Provably Secure Certified Mail", at <<http://domino.watson.ibm.com/library/cyberdig.nsf/papers/1F67674EC568AA228525689D004C3733/$File/rz3207.pdf>>, IBM Research Division, Aug. 2000, pp. 13.

Wang, et al., "Generic, Optimistic, and Efficient Schemes for Fair Certified Email Delivery", available at least as early as Aug. 21, 2007, at <<http://icsd.i2r.a-star.edu.sg/staff/guilin/papers/ICICS05-CEM-fl.pdf>>, pp. 13.

The Chinese Office Action mailed Feb. 6, 2012 for Chinese patent application No. 200880111327.9, a counterpart foreign application of U.S. Appl. No. 11/868,872, 9 pages.

Chinese Office Action mailed Oct. 10, 2012 for Chinese patent application No. 200880111327.9, a counterpart foreign application of US Appl. No. 11/868,872, 8 pages.

* cited by examiner

EXEMPLARY SCENARIO 820

EXAMPLE 821

SENDER DOES NOT SEND CERTIFICATE
822

RECEIVER DOES NOT SEND SIGNATURE
824

EXAMPLE 823

RECEIVER SENDS SIGNATURE TO SENDER
826

SENDER CANNOT USE SIGNATURE TO PROVE RECEIVER RECEIVED A CORRECT MESSAGE
828

FIG. 10

EFFICIENT CERTIFIED EMAIL PROTOCOL

BACKGROUND

In the world of postal delivery, when a registered letter arrives, a person officially receives the letter if and only if that person signs an acknowledgement that attests to receipt of the letter. In this example, two actions (i.e., signing an acknowledgement and receiving the letter) occur simultaneously. In an electronically connected world, electronic mail (i.e., "emails") are used widely. Most people prefer email to snail mail when communicating with others due to convenience and fast delivery, as well as documentation (e.g., a sent items box). To place email on par with conventional postal delivery, an email system should include some type of function that provides the same assurance as a registered letter. In particular, such a function should require a receiver of an email to sign an acknowledgement of reception before the registered email can be read.

In contrast to the world of postal delivery for registered letters, for an email system, the two actions, i.e., signing and receiving, cannot occur simultaneously due to the email system's distributed nature: protocols used in an email system are asynchronous by nature.

Some services exist that can provide a "registered letter" in a distributed environment. For example, a so-called certified email protocol, also known as the non-repudiation protocol can provide for a fair exchange of a message and an undeniable receipt between two untrusted parties over a network such as the Internet.

In addition to certified emails, a certified email protocol can also be used in many other applications. One application is to secure an itinerary of a mobile agent, where a certified email protocol is applied between two adjacent hosts when a mobile agent passes from one host to the other. In this context, the non-deniable message and receipt offered by a certified email protocol can be used to identify the origin of an attack if the itinerary of the mobile agent is altered. Other applications that can benefit from a certified transaction protocol include applications that encourage people to share or propagate contents such as self-created movies or advertisements, where a certified email protocol can help assure that users who share content get awards by redeeming the receipts from those that receive the content.

Certified email protocols have been studied widely by the cryptography research community. Certified email protocols address a problem that is essentially a subset of a problem addressed by the so-called "fair exchange protocol", where exchanged items are not necessarily restricted to messages and receipts as in certified email protocols (i.e., digital items other than emails can be exchanged using the fair exchange protocol). For example, both parties can exchange signatures signed by each individual party in a fair exchange protocol.

Depending on the availability and setting of a Trusted Third Party (TTP), fair exchanges can be classified into the following four types: (1) without a TTP, (2) with an inline TTP, (3) with an online TTP, and (4) with an off-line TTP. For the first type of fair exchanges, as early as in 1980, studies showed that it is impossible to realize fairness in a deterministic two-party fair exchange protocol. Existing protocols can provide only partial fairness: computational fairness or probabilistic fairness. Such protocols, however, tend to be too complex and inefficient to be applied in practical applications (e.g., distributed Web-based applications). For the second type of fair exchanges, the TTP acts as an intermediary between the sender and the receiver, and the entire message is sent through the TTP. An inline TTP can provide full fairness since all exchanged messages are fully controlled by the TTP. The TTP, however, may become a performance bottleneck, especially when many large messages have to be forwarded at the same time. For the third type, an online TTP, which is similar to an inline TTP, must be available for the entire lifetime of the exchange. In such a setting, the TTP does not need to forward the entire message. Only the signaling information such as the cryptographic key is processed and forwarded by the TTP. For the last type of fair exchanges, also known as the optimistic protocol, the TTP is involved only if one of the parties behaves maliciously or the communication channel is interrupted during execution of the exchange protocol. This property is practical in many applications, including the distributed environment mentioned above (e.g., distributed Web-based environment).

Aside from specific certified email protocols, various generic certified email protocols exist, where generic encryption and signature primitives are used. Such generic certified email protocols usually utilize the following approach: (i) encrypting a message by a symmetric encryption scheme, (ii) encrypting the key used in the symmetric encryption by a public key encryption scheme with the TTP's public key, and (iii) signing the resulting cipher text by a signature scheme with the sender's private key. In such a scheme, when the receiver receives the signature, the receiver first checks validity of the received signature. If it is valid, the receiver sends a receipt to the sender to indicate that the receiver has received the message. The receiver's interest is protected since if the sender refuses to reveal the exchanged message, the TTP can reveal the message for the receiver.

Overall, the off-line TTP approach has advantages yet, to date, off-line TTP certified email protocols lack efficiency. As described herein, various exemplary techniques can improve efficiency of off-line TTP certification protocols. Such techniques may be implemented in the context of email and/or other transactions that occur in a distributed environment.

SUMMARY

An exemplary optimistic protocol for a two-party transaction includes a setup sub-protocol that includes an authorized Diffie-Hellman key agreement, an exchange sub-protocol that includes sending a certificate from a sending party to a receiving party and sending a receipt from the receiving party to the sending party and a dispute sub-protocol that includes a dispute resolution mechanism for resolving disputes between the sending party and the receiving party due to sending of an invalid certificate, due to sending an invalid receipt, or due to abortion of the exchange sub-protocol. Other exemplary methods, systems, etc., are also disclosed.

DESCRIPTION OF DRAWINGS

Non-limiting and non-exhaustive examples are described with reference to the following figures:

FIG. 10 is a block diagram of an exemplary dispute scenario that involves a malicious sender.

DETAILED DESCRIPTION

Various exemplary techniques implement an authorized key agreement in a fair exchange protocol. A certified email protocol, also known as a non-repudiation protocol, allows a message to be exchanged for an acknowledgement of reception in a fair manner: a sender Alice sends a message to a receiver Bob if and only if Alice receives a receipt from Bob. As described in more detail below, an exemplary approach applies the authorized Diffie-Hellman key agreement protocol to construct certified email protocols. Such an exemplary approach results in an optimistic certified email protocol with an off-line trusted third party being involved only when a party cheats or, for example, a communication channel is interrupted during an exchange.

Information from comparative trials with other optimistic certified email protocols indicate that an exemplary certified email protocol with an authorized key agreement is the most efficient optimistic certified email protocol.

An exemplary protocol described herein is a certified email protocol with an off-line TTP. Such an exemplary protocol can allow for encryption of a message in the context of a certified email protocol. In contrast to other certified email protocols with an off-line TTP, which use an off-line TTP's public key to encrypt a randomly selected message encryption key so that the TTP can extract the message encryption key to reveal the message in the execution of the dispute protocol, an exemplary protocol encrypts a message with a key shared between the sender and the TTP, yet without involving the TTP during the exchange. In such an exemplary approach, the conventional step to apply a public key encryption scheme to encrypt the message encryption key is not required, which results in a more efficient protocol.

Figure 1:
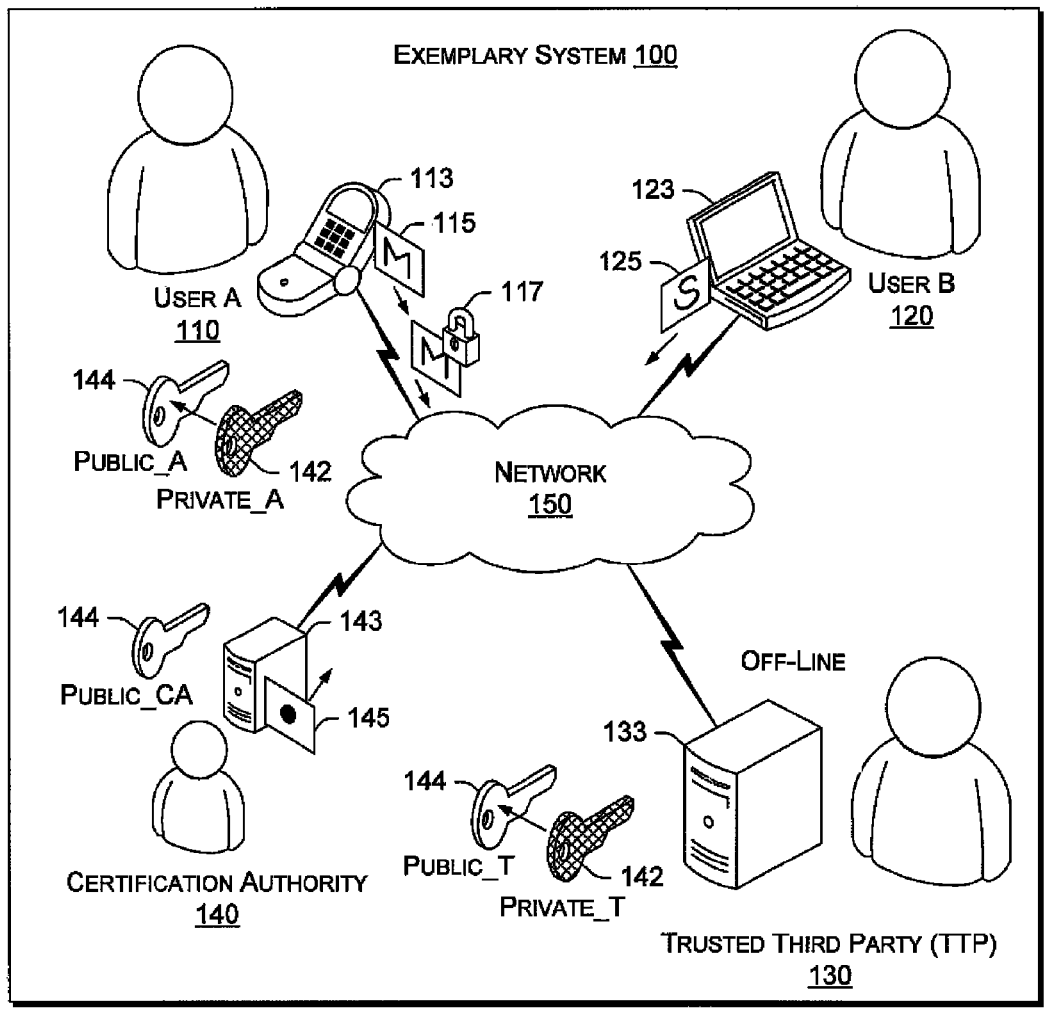
FIG. 1 is a diagram of an exemplary system for transactions in a distributed application environment.
Figure 1:
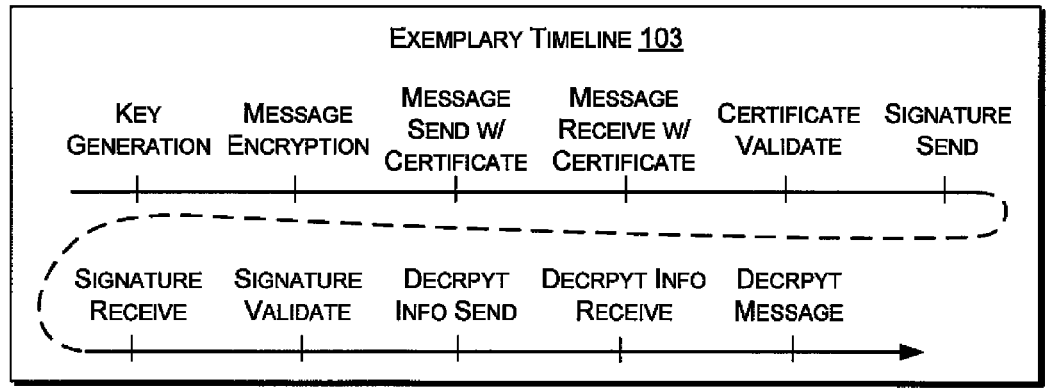

FIG. 1 shows an exemplary system 100 along with a timeline 103. The system 100 includes User A 110 as a message sender (sending party), User B 120 as a message receiver (receiving party), an off-line trusted third party (TTP) 130 for handling disputes and a certification authority (CA) 140 for issuing certificates. The various parties 110, 120, 130 and 140 have associated computing devices 113, 123, 133 and 143, respectively, that include communication links to a network 150. Various keys are shown in FIG. 1 where private keys are labeled 142 along with an association indicator (e.g., A, CA, T) and public keys are labeled 144 along with an association indicator (e.g., A, CA, T).

The exemplary timeline 103 shows a series of events, which may be categorized as corresponding to portions of a protocol (e.g., sub-protocol) and phases involved in a transaction. For example, during an initializing phase that involves key generation, the TTP 130 selects a private key 142 (Private_T) and computes a public key 144 (Public_T) and User A 110 selects a private key 142 (Private_A) and computes a public key 144 (Public_A) and registers key 144 with CA 140 to get a certificate 145 that binds User A 110 with the User A's public key 144 (Public_A).

In a message preparing and sending phase, User A 110 encrypts a message 115 and sends an encrypted message 117 and information, including a message description and the certificate 145, to User B 120.

In a receiving phase, User B 120 checks the certificate 145 of User A 110 and performs another check of the information received. If both checks are OK, then User B 120 sends a signature 125 to User A 110.

In a validating phase, User A 110 receives the signature 125 from User B and checks the signature 125 to see whether it is valid. If the signature 125 is valid, then User A 110 sends information to User B 120 to decrypt encrypted message 117.

In a decrypting phase, User B 120 receives the information from User A 110 and decrypts the encrypted message 117. However, if User B 120 (i) does not receive the information or (ii) the decrypted message does not match the previously received message description, then User B 120 can invoke a dispute protocol (e.g., a dispute resolving phase).

An exemplary protocol operates in conjunction with the authorized Diffie-Hellman key agreement to share a message encryption key between a sender and a TTP. Such an exemplary protocol is fair and optimistic and exhibits the following properties:

Fairness: Like other certified email protocols, the exemplary protocol guarantees fairness, i.e., a malicious party cannot gain any advantage over the other party in exchange of a message and a receipt;

Optimism: The TTP is involved only when one party conducts malicious behavior or the communication channel is interrupted during exchange, which makes the protocol optimistic;

TTP's Statelessness: The TTP does not need to store any state information during execution of the protocol, for example, no state information is required to deal with disputes between two parties; and High Performance: The exemplary protocol exhibits in performance tests the smallest computational and communicational cost compared to other tested certified email protocols.

An exemplary protocol may further include features to deal with subtle issues of timely termination. In various examples, confidentiality of a message is addressed where, to gain fairness, a message "m" is encrypted. In an exemplary exchange, a transaction involves exchanged message "m" and the signature of message "m".

Figure 2:
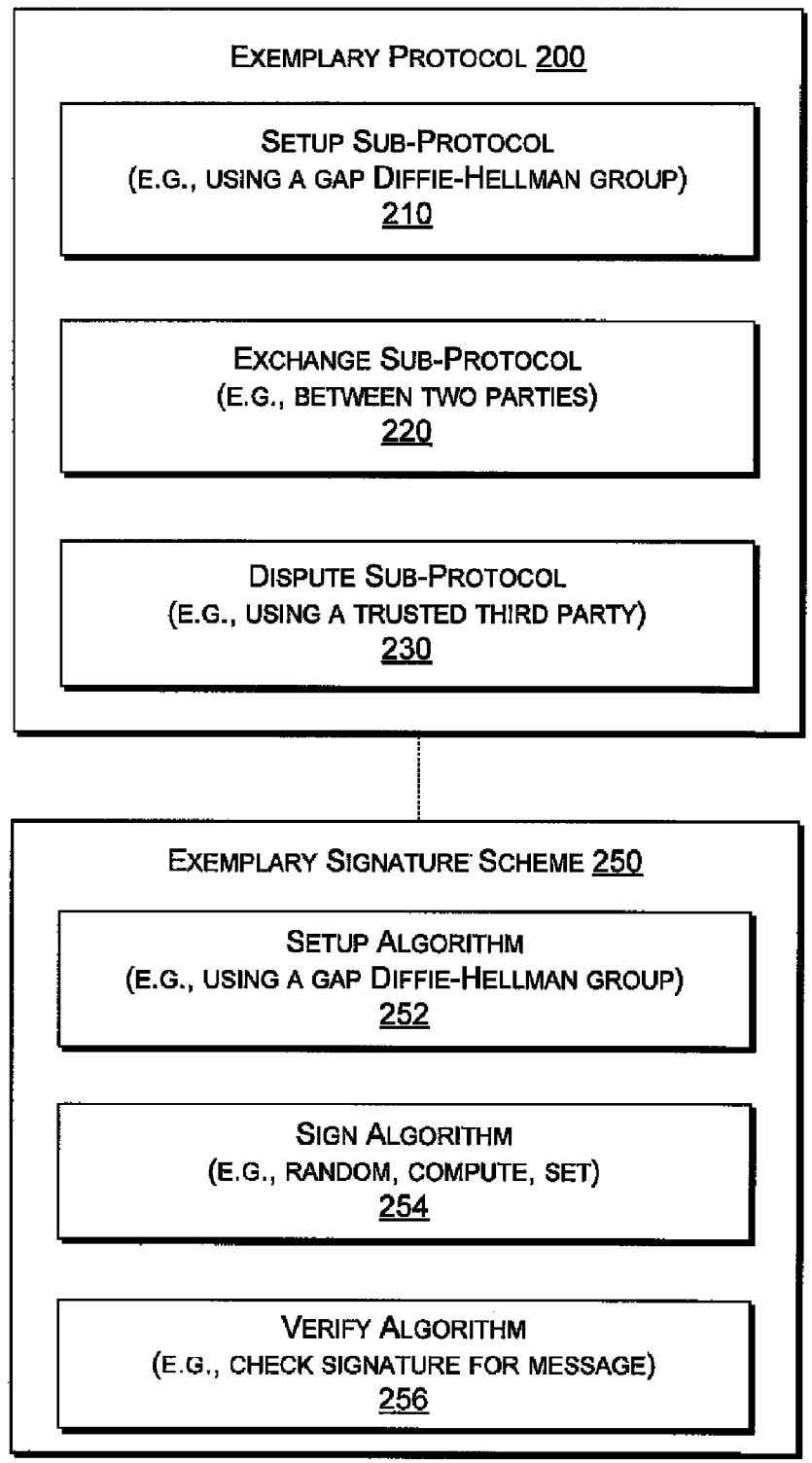
FIG. 2 is a block diagram of an exemplary protocol and an exemplary signature scheme for use with the protocol.

FIG. 2 shows an exemplary protocol 200 as including a setup sub-protocol 210, an exchange sub-protocol 220 and a dispute sub-protocol 230. FIG. 2 also shows an exemplary signature scheme 250 for use in the protocol 200. In the example of FIG. 2, the signature scheme 250 is a modified Schnorr signature scheme. The signature scheme 250 includes a setup algorithm 252, a sign algorithm 254 and a verify algorithm 256. In the example of FIG. 2, the signature scheme 250 is proven to be secure against the adaptively chosen message attack in the random oracle model with the discrete logarithm assumption.

The setup algorithm 252 takes as input a security parameter $1^k$ and outputs a public key $(G,q,g,H(\cdot),y)$ and a secret key $x$, where $q$ is a large prime, $G$ is a finite cyclic group with the generator $g$ of order $q$, $H(\cdot)$ is a cryptographic hash function: $\{0,1\}^* \rightarrow Z_q^*$, and $y=g^x \in G$. M is the domain of messages.

The sign algorithm 254 signs a message $m \in M$, by applying the following operations: (1) choose a random $r \in Z_q^*$, (2) compute $R=g^r \in G$, and (3) set the signature to be $\sigma=(R,s)$, where $s=r+xH(m\|R\|y) \mod q$.

The verify algorithm 256 verifies a signature. For example, to verify a signature σ for message m, the verifier checks $g^s \stackrel{?}{=} Ry^{H(m\|R\|y)} \in G$. If the equation holds, the signature is valid and output_b=1; otherwise, the signature is invalid and the algorithm outputs b=0.

Figure 3:
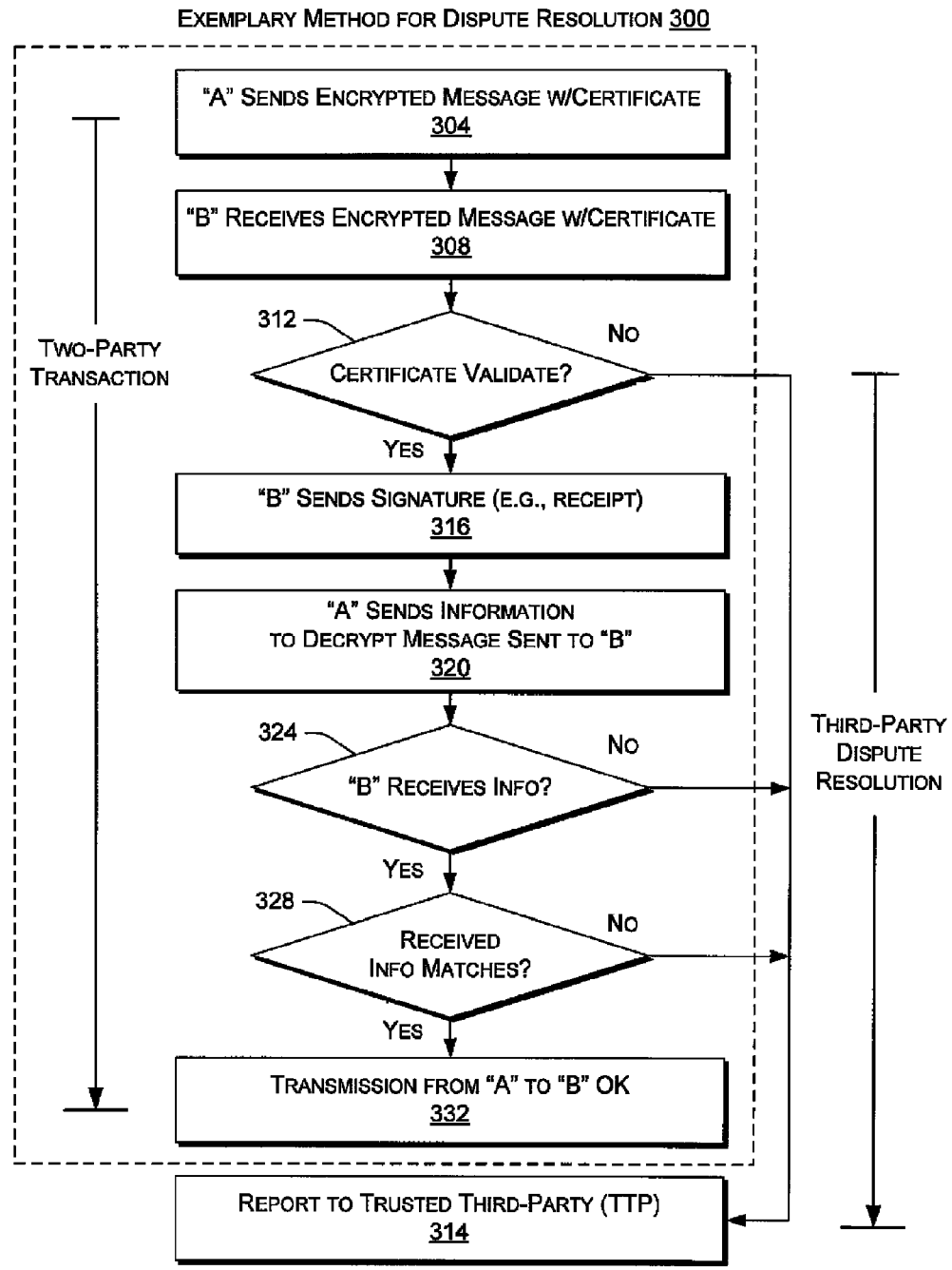
FIG. 3 is a block diagram of an exemplary method for dispute resolution involving an off-line third party.

FIG. 3 shows an exemplary method for dispute resolution 300. The method 300 includes various two-party transaction steps and a third party dispute resolution mechanism that uses an off-line trusted third party (TTP). In a step 304, a User A, a sending party, sends an encrypted message with a certificate to a User B, a receiving party. In a step 308, the User B receives the encrypted message with the certificate. A decision block 312 decides for User B whether the certificate received from User A is valid. If the decision block decides that the certificate is not valid, then the method 300 reports in a reporting step 314 to an off-line TTP for resolution of this issue. However, if the decision block 312 decides that the certificate is valid, then the method 300 continues at a step 316 where User B sends a signature (e.g., a receipt) to User A, the sender.

In response to receipt of a signature, at a step 320, User A sends information to User B to decrypt the message. A decision block 324 decides if User B received the information to decrypt the message. If the decision block 324 decides that User B did not receive the information, then the method 300 reports to the off-line TTP per step 314; otherwise, the method 300 continues at another decision block 328 that decides whether the received information matches or corresponds to the previously received encrypted message (see step 308). If the information does not match or correspond, then the method 300 reports to the TTP at step 314; otherwise, the method 300 proceeds to a step 332 where the transmission from User A to User B is acknowledged as successful (e.g., "OK").

According to the method 300, the transmission of a message (e.g., an encrypted message) from the sending party (User A) to the receiving party (User B) occurs as a two-party transaction and only if an issue arises does a third party (TTP) become involved. Hence, the method 300 provides for efficient transmission with assurances of third party oversight and dispute resolution.

As already mentioned with respect to FIG. 2, an exemplary certified email protocol 200 includes three sub-protocols: the setup sub-protocol 210, the exchange sub-protocol 220, and the dispute sub-protocol 230. For example, in FIG. 1, assume that User A 110 is Alice, a sender/sending party, User B 120 is Bob, a receiver/receiving party, and the TTP 130 is Charlie. Also assume that the public key 144 (Public_CA) of the Certification Authority (CA) 140 and the three parties are known to everyone. Let m denote the sent message 115 (or, as encrypted, the encrypted message 117) and let $\sigma_B$ denote the receipt (i.e., the signature 125 from User B 120, Bob).

Given the aforementioned conditions, the sub-protocol 210 can choose system parameters (q,G,g), where q is a large prime, and G is a gap Diffie-Hellman (GDH) group with the generator g whose order is q. Then Charlie 130 selects his random private key 142 (Private_T) $x_c \in Z_q^*$, and computes and publishes the corresponding public key 144 (Public_T) $y_c = g^{x_c} \in G$.

Alice 110 also selects her random private key 142 (Private_A) $x_a \in Z_q^*$, and computes the corresponding public key 144 (Public_A) $y_a = g^{x_a} \in G$. But, she registers her public key 144 (Public_A) and her system parameter with a CA 140 to get her certificate 145 $C_A$ which binds her identity $ID_A$ with the corresponding public key 144 (Public_CA) $(q, G, g, y_a)$.

According to this example, a finite cyclic group G, with the generator g whose order is prime q, is a gap Diffie-Hellman (GDH) group if the following first problem can be solved in polynomial time but no p.p.t. algorithm can solve the following second problem with non-negligible advantage over a random guess within polynomial time. Also, a decisional Diffie-Hellman problem can be characterized as, given $(g, g^a, g^b, g^c) \in G*G*G*G$, decide whether $c = ab \in Z_q^*$, where a,b,c are three random numbers in $Z_q^*$. In this problem, if $c = ab \in Z_q^*$, then $(g, g^a, g^b, g^c)$ is a Decisional Diffie-Hellman (DDH) tuple. A computational Diffie-Hellman problem is characterized, given $(g, g^a, g^b) \in G*G*G$, to compute $g^{ab} \in G$, where a,b are two random numbers in $Z_q^*$.

For the exchange sub-protocol 220, Alice 110 sends to Bob 120 a message $115^m$ (or, as encrypted, an encrypted message 117C) with message information, referred to in this example as a message description $Dsc_m$, and Alice 110 receives a receipt 125 (e.g., signature) from Bob 120. The message description $Dsc_m$ can be configured to enable a user to verify a message. For example, a simple description is the hash value of the message. The actual description can depend on the application that uses the protocol. When used in an application to encourage sharing multimedia, $Dsc_m$ may be a description of the multimedia content such as its title, creator, etc. Noting that, in general, knowledge of the description $Dsc_m$ does not disclose its message m.

In the sub-protocol 220, the message description $Dsc_m$ is used to check if a decrypted message matches its description. In the following description, $(E_k(\bullet), D_k(\bullet))$ is a pair of symmetric encryption and decryption operations with the encryption key k. $H(\bullet)$, $H_1(\bullet)$ and $H_2(\bullet)$ are cryptographic hash functions. The sub-protocol 220 can proceed according to the following example:

I. Alice 110 first chooses a random number $r \in_R Z_q^*$, and computes $R_1 = g^r \in G$, $R_2 = y_c^r \in G$, $R' = H(R_2)$, $k = H_1(R_2)$, $C = E_k(m)$, $s_A = r + x_a H_2(C\|Dsc_m\|ID_A\|ID_B\|ID_C\|R_1\|R'\|y_a)$ mod q. Alice 110 then sends information $(C_A, R_1, R', C, Dsc_m, s_A)$ to Bob 120, where certificate 145 $C_A$, is Alice's certificate obtained with the setup sub-protocol 210.

II. On receiving the information $(C_A, R_1, R', C, Dsc_m, s_A)$ from Alice 110, Bob 120 first validates Alice's certificate 145 $C_A$, and then checks if the following equation holds, $$g^{s_A} \stackrel{?}{=} R_1 y_a^{H_2(C\|Dsc_m\|ID_A\|ID_B\|ID_C\|R_1\|R'\|y_a)} \in G.$$

If both checks are fine, Bob 120 sends to Alice 110 his signature 125 $\sigma_B$ on $(R_1, R', C, Dsc_m, s_A, ID_A, ID_B, ID_C)$.

III. Upon receiving the signature 125 $\sigma_B$ from Bob 120, Alice 110 first validates Bob's signature 125 $\sigma_B$. If the validation of the signature 125 is successful, Alice 110 sends a parameter $R_2$ to Bob 120.

IV. Upon receiving the parameter $R_2$, Bob 120 computes the key $k = H_1(R_2)$ and uses it to decrypt the encrypted message 117 C previously received to obtain the wanted message 115 $m = D_{H_1(R_2)}(C)$. The decrypted message 115 m is considered as valid if and only if m does match the message description $Dsc_m$ previously received. If Bob 120 does not receive the parameter $R_2$, or $R' \neq H(R_2)$, or the decrypted message 115 m does not match its description $Dsc_m$, Bob 120 can invoke the dispute protocol 230.

The parameter $R_1$ can be used as a part of the key material in the Diffie-Hellman key agreement in the dispute sub-protocol 230; the parameter $R_2$ is the resulting key of the Diffie-Hellman key agreement. The set $(R_1, s_A)$ is a signature on $(C, R', Dsc_m, ID_A, ID_B, ID_C)$ corresponding to the public key $y_a$ obtained by using the modified Schnorr signature scheme.

Noting that in item II above, Bob's signature 125 $\sigma_B$ can be any suitable type of signature.

Alice 110 can use the signature 125 $\sigma_B$ she receives from Bob 120 as a receipt to prove to another person (e.g., John) that Bob 120 has received the message 115 $m$ from her according to the following procedure:

1. Alice sends John ($\sigma_B$,$R_1$,R',C,$Dsc_m$,$s_A$,$C_A$,$ID_B$,$ID_C$,m, $R_2$)
2. John checks whether:
   i. m is consistent with $Dsc_m$,
   ii. $\sigma_B$, $s_A$, $C_A$ are valid,
   iii. C=$E_{H_1(R_2)}$(m),
   iv. R'=H($R_2$), and
   v. (g,$R_1$,$y_c$,$R_2$) is a Decisional Diffie-Hellman (DDH) tuple.

In this example, if all the above checks pass, the non-party entity (e.g., John) is convinced that Bob 120 indeed received the message 115 $m$ from Alice 110.

In various examples, an exemplary protocol uses a gap Diffie-Hellman group. In such examples, Alice 110 can determine whether (g,$R_1$,$y_c$,$R_2$) is a DDH tuple or not by using some special algorithms such as pairing. In some applications, Alice 110 may need to prove only to the TTP 130 that Bob 120 has received message 125 $m$ (e.g., where John is the TTP). In this case, the protocol is the same as described above except that the gap Diffie-Hellman group can be replaced with a finite cyclic group whose CDH problem is computationally hard (noting that a gap Diffie-Hellman group is always a CDH-hard group but not vice versa) and it is not necessary to use a gap Diffie-Hellman group's algorithms such as pairing to solve the DDH problem. Since the TTP 130 already knows its own secret key 142 (Private_T) $x_c$, the TTP 130 can determine whether (g,$R_1$,$y_c$,$R_2$) is a DDH tuple by checking whether $R_2$=$R_1^{x_c}$ holds.

With respect to the dispute sub-protocol 230, if Bob 120 has sent his signature 125 $\sigma_B$ to Alice 110 but has not received the parameter $R_2$, or the received parameter $R_2$ from Alice 110 is invalid, Bob 120 can invoke the dispute sub-protocol 230 and send to the TTP Charlie 130 the information ($C_A$,$R_1$,R', C,$Dsc_m$,$ID_A$,$ID_B$,$ID_C$,$s_A$,$\sigma_B$) (e.g., sometimes referred to as an information vector). With respect to a received parameter $R_2$ being considered invalid, if the decrypted message 115''' does not match its description $Dsc_m$, or R'≠H($R_2$) then the parameter $R_2$ can be considered invalid. Upon receiving the data (e.g., the vector) from Bob 120, The TTP Charlie 130 can perform the following operations:

1. Charlie 130 first validates the received data. This step can be the same as the data validation steps in the exchange sub-protocol 220. Charlie 130 aborts if the validation fails. Otherwise, Charlie 130 continues.
2. Charlie 130 computes the parameter $R_2$=$R_1^{x_c}$∈G, and applies the decryption operation to obtain the message 115 $m$ (=$D_{H_1(R_2)}$(C)). If the message 115 $m$ does match its description $Dsc_m$, and R'=H($R_2$), Charlie 130 sends the parameter $R_2$ to Bob 120 and the signature 125 $\sigma_B$ to Alice 110.

If the message 125 $m$ does match its description $Dsc_m$, or R'≠H($R_2$), Alice 110 cannot use Bob's signature 125 as a receipt to prove to others that Bob 120 has received the message 115 $m$ from her since the data validation described would fail (see, e.g., aforementioned validation test).

As described herein, an exemplary optimistic protocol for a two-party transaction includes a setup sub-protocol that includes an authorized Diffie-Hellman key agreement, an exchange sub-protocol that includes sending a certificate from a sending party to a receiving party and sending a receipt from the receiving party to the sending party and a dispute sub-protocol that includes a dispute resolution mechanism for resolving disputes between the sending party and the receiving party due to sending of an invalid certificate, due to sending an invalid receipt, or due to abortion of the exchange sub-protocol. With respect to the latter, the exchange sub-protocol may be aborted for any of a variety of reasons, including action by a party, hardware failure, software failure, transmission failure, etc. In such a protocol, the transaction may be an email transaction. In such a protocol, the exchange sub-protocol can include sending an encrypted message with the certificate.

An exemplary exchange sub-protocol can include sending decryption information from a sending party to a receiving party to decrypt information sent previously from the sending party to the receiving party. An exemplary exchange sub-protocol can include sending information from a sending party to a receiving party and comparing the information against information sent previously from the sending party to the receiving party. In such a sub-protocol, an unfavorable comparison can invoke a dispute sub-protocol, for example, a dispute sub-protocol that involves a trusted third party (e.g., normally an off-line party to a two party transaction).

An exemplary protocol includes an authorized Diffie-Hellman key agreement that includes sharing an encryption key between a sending party and a trusted third party (e.g., normally an off-line party to a two party transaction). In various exemplary optimistic protocols, a sending party and a receiving party transact via a distributed application operating in a distributed computing environment (e.g., a Web-base application).

An exemplary setup sub-protocol includes binding a public key of the sending party to a certificate for the sending party. Such a sub-protocol can include a modified Schnorr signature scheme for generating a signature for a receiving party, which can then be sent to another party.

FIGS. 4, 5, 6 and 7 present exemplary methods 400, 500, 600 and 700, which pertain to key generation, sender actions (e.g., actions of a sending party), receiver actions (e.g., actions of a receiving party) and dispute actions (e.g., actions involving an off-line trusted party), respectively.

Figure 4:
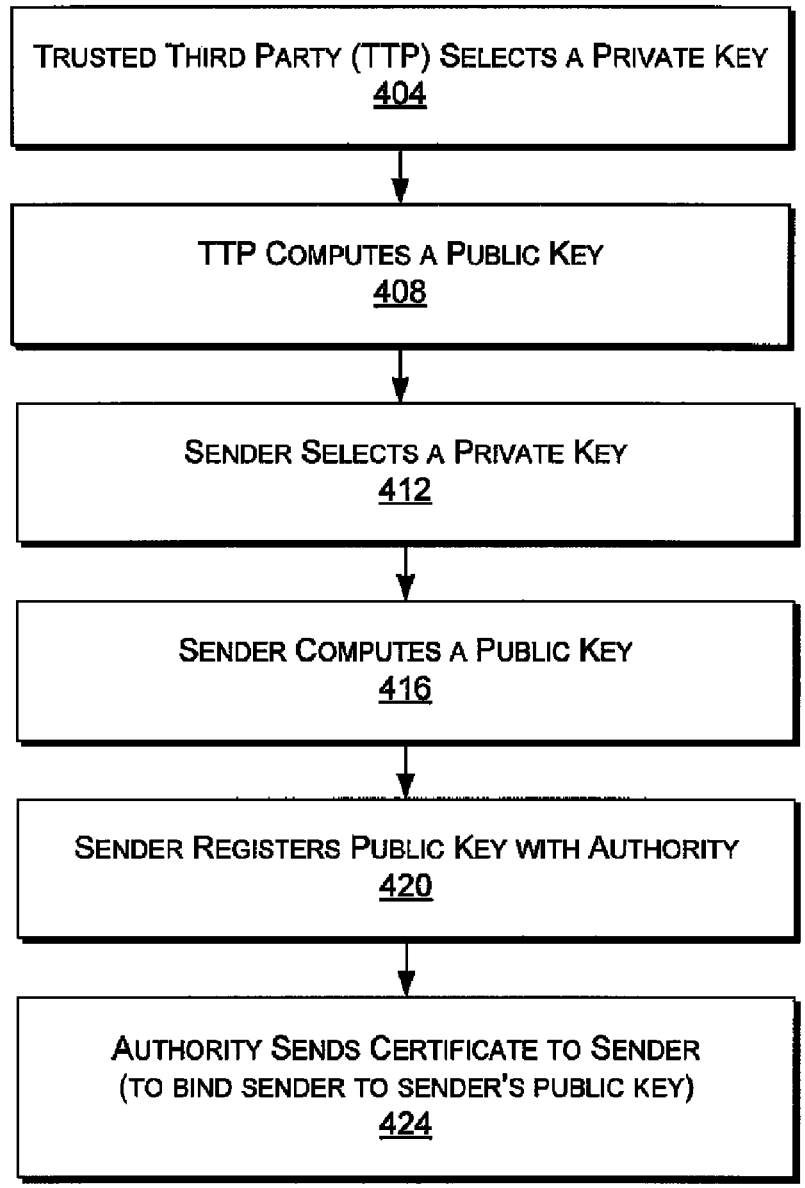
FIG. 4 is a block diagram of an exemplary method for key generation.

FIG. 4 shows a block diagram of the exemplary method for key generation 400. In a selection block 404, a trusted party (TTP) selects a private key. Next, in a computation block 408, the trusted party computes a public key. In another selection block 412, a sender selects a private key and, in a computation block 416, the sender computes a public key. A registration block 420 follows where the sender registers its public key with an authority. In response, via a send block 424, the authority sends a certificate to the sender to bind the sender to the sender's public key.

Figure 5:
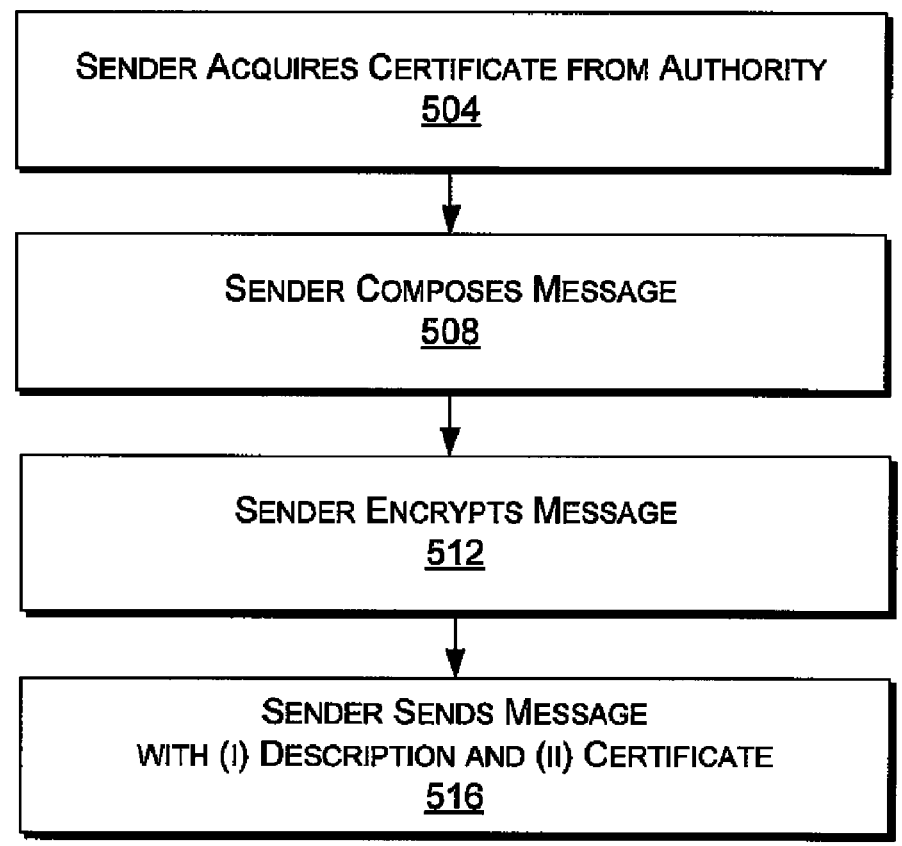
FIG. 5 is a block diagram of an exemplary method for a sender in a transaction.

FIG. 5 shows a block diagram of an exemplary method for a sender 500. In an acquisition block 504, a sender (e.g., a sending party) acquires a certificate from an authority. For example, as explained in the method 400, a sender can acquire a certificate from an authority that binds the sender with a public key of the sender. In a composition block 508, the sender composes a message. Next, in an encryption block 512, the sender encrypts the message, which may be an optional action that depends on the application and/or circumstances (e.g., receiving party or parties, the communication link, etc.). In the example of FIG. 5, after encryption, in a send block 516, the sender sends the message with (i) a description of the message and (ii) a certificate.

In the example of FIG. 5, an encrypted message, a description of the message and a certificate are sent to a receiver. However, as an alternative, a description of the message and the certificate may be sent without the message. For example, where the message is not encrypted but where a trusted party dispute mechanism is desired, the message may be sent at a later time after the sender receives a receipt or signature from the receiver.

In general, a sender will send an encrypted message and some information related to a message along with a certificate, a receiver will send a receipt and, if the receipt is valid, then the sender will send information to decrypt the encrypted message where the receiver can check the decrypted message against the previously received information.

An exemplary method includes providing a public key to a certification authority, receiving a certificate from the certification authority that binds the public key, sending an encrypted message and the certificate to a receiving party, receiving a signature from the receiving party and, in response to the receiving, sending information to the receiving party to decrypt the message. Such a method can include sending a description of the message with the encrypted message.

Figure 6:
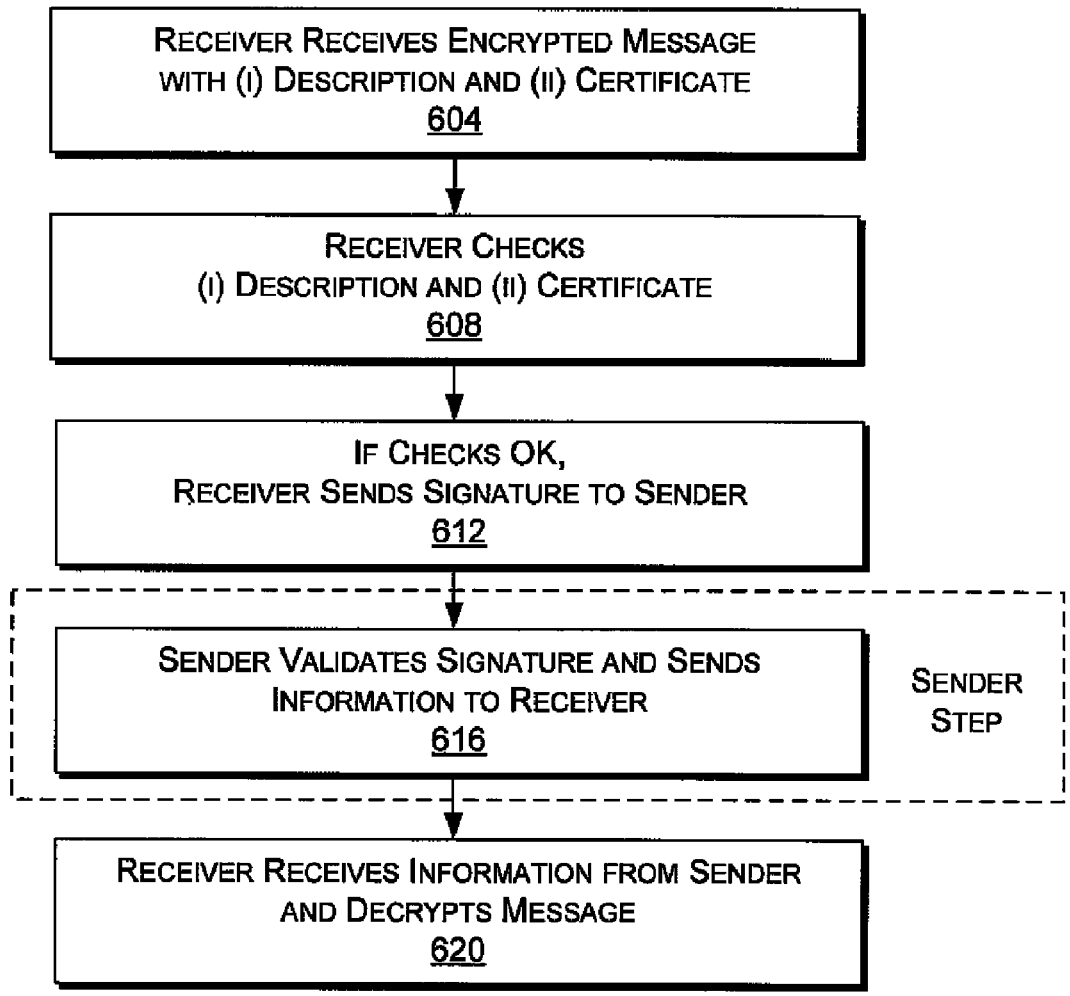
FIG. 6 is a block diagram of an exemplary method for a receiver in a transaction.

FIG. 6 shows a block diagram of an exemplary method for a receiver 600. In a reception block 604, a receiver (e.g., receiving party) receives an encrypted message with (i) a description of the message and (ii) a certificate. In a check block 608, the receiver checks the description and the certificate. For example, the receiver can check the certificate to see if it is valid. A send block 612 assumes that the checks per the check block 608 were successful (i.e., OK) and sends a signature to the sender of the message. In the example of FIG. 6, before the receiver takes any further action, the sender must act per a validation and send block 616. In the sender block 616, the sender validates the receiver's signature and then sends information to the receiver where the information pertains to encryption of the message. In a reception and decryption block 620, the receiver receives the decryption information and decrypts the message.

An exemplary method includes generating a signature, receiving an encrypted message and a certificate from a sending party, sending the signature to the sending party, receiving information from the sending party to decrypt the message and decrypting the message. Such a method can include generating the signature using a modified Schnorr signature scheme. In such an exemplary method, a receiving party can receive a description of the message from the sending party prior to the decrypting and then compare a decrypted message against the description of the message. For example, the description can include information that can be compared against information in the decrypted message. If the comparison is favorable, then no further action need be taken. However, if the comparison is not favorable, then the receiving party can act to resolve the dispute with a trusted third party.

As already explained with respect to FIG. 3, disputes may arise at various points as actions are taken or omitted by a sender and/or a receiver. In addition, faulty information can give rise to a dispute. Further, equipment and/or software failure can give rise to a dispute. In general, abortion of an exchange protocol for any of a variety of reasons can give rise to a dispute. For example, during a transmission failure, a sending party or a receiving party may invoke a dispute mechanism (e.g., to ensure a proper transaction, to notify that a problem occurred with a transaction, to provide diagnostic information, etc.).

Figure 7:
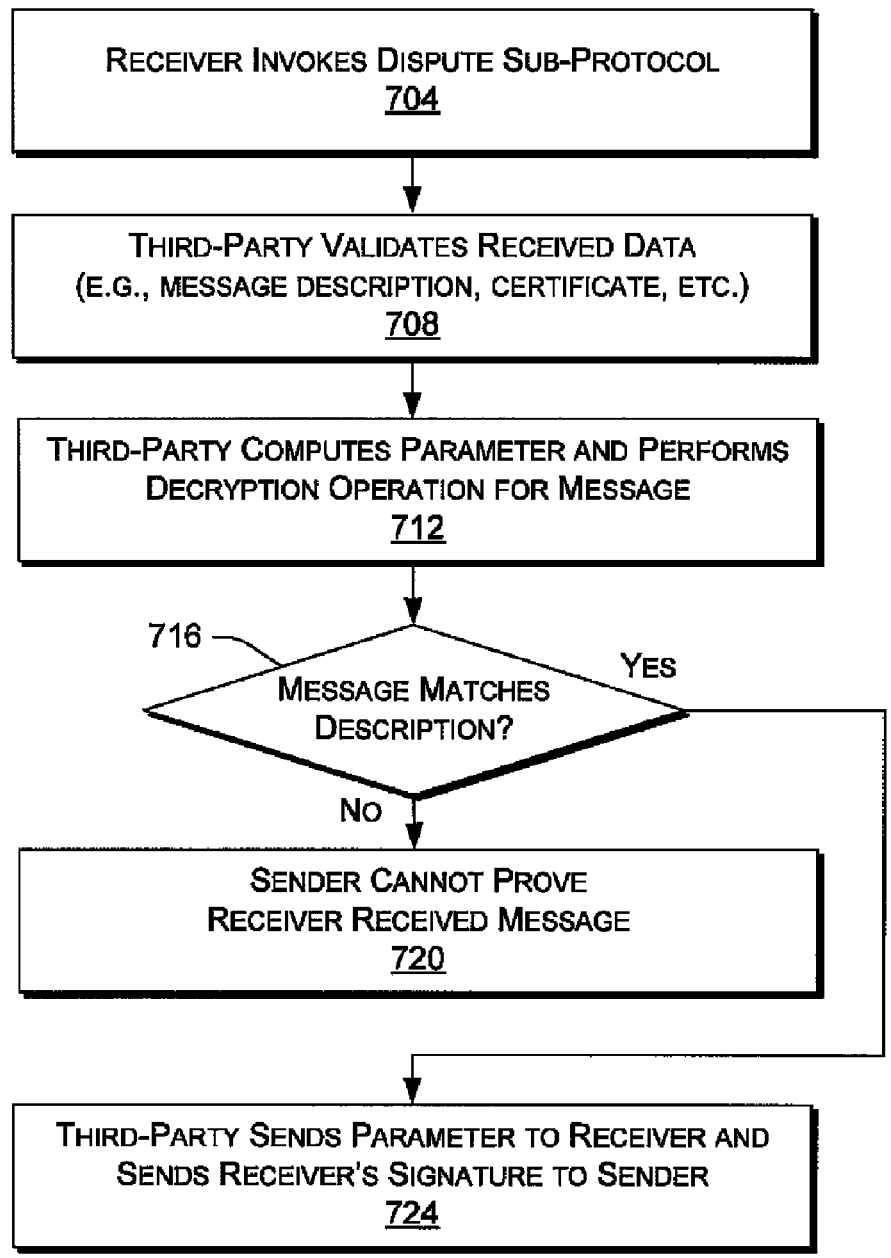
FIG. 7 is a block diagram of exemplary method for a third party to handle disputes in transactions.

FIG. 7 shows a block diagram of an exemplary method for a third party 700. In the example of FIG. 7, the third party handles disputes by implementing one or more dispute mechanisms aligned with sender and/or receiver requirements. For example, requirements include (i) a sender must acquire a certificate and (ii) a receiver must send a receipt (e.g., a signature) where (iii) the receiver can validate the certificate and (iv) the sender can validate the signature. In addition, as already explained, a sender can send information to a receiver such as a description of a message, which the receiver can later check against a received message and/or a decrypted message.

In the method 700, per an invocation block 704, a receiver invokes a dispute sub-protocol, noting that any party to a transaction may invoke the dispute sub-protocol. In various examples, a transaction involves sending a message from a first party (e.g., a sending party) to a second party (e.g., a receiving party). As described herein, other types of transactions are possible and various parties to such transactions may invoke such a dispute sub-protocol, assuming some basic requirements are met, as discussed above (e.g., i-iv).

In a validation block 708, a third party validates data (e.g., information) received by the receiver (e.g., certificate, description of a message, receipt, etc.). Next, in a computation and decryption block 712, the third party computes a parameter (e.g., the parameter $R_2$) and then performs a decryption operation to decrypt the encrypted message that a sender has sent to the receiver. With the message decrypted, the third party decides per a decision block 716 if the decrypted message matches the description provided by the receiver (e.g., as received from a sender). If the decision block 716 decides that the message does not match the description, then, per a conclusion block 720, the method 700 concludes that the sender cannot prove that the receiver received the message. However, if the decision block 716 decides that the message matches the description, then, per a send block 724, the third party sends the parameter (e.g., the parameter $R_2$) to the receiver and sends the receiver's signature or receipt to the sender.

Security of an exemplary certified transaction protocol (e.g., the protocol 200 of FIG. 2) can be analyzed as follows. The modified Schnorr signature scheme is secure against the adaptively chosen message attack with the discrete logarithm (DL) assumption in random oracle model and public key substitute attack. Consider a proof, compared with the original Schnorr signature scheme, the only difference in the modified Schnorr signature scheme is $H(m\|R\|y)$ instead of $H(m\|R)$. In a random oracle model, however, both hash oracles can choose to respond with the same output to the query to $H(m\|R\|y)$ on input $(m,R,y)$ and the query to $H(m\|R)$ on input $(m,R)$. Since the Schnorr signature scheme is proved to be secure against the adaptively chosen message attack with the DL assumption in the random oracle model, one can conclude that the modified Schnorr signature scheme is also secure against the adaptively chosen message attack in random oracle model. According to the security analysis, on the other hand, the modified Schnorr signature scheme can resist the public key substitute attack, i.e., there exists only a negligible possibility that a different public key can be found to satisfy the signature corresponding to a specified public key. As a result, we conclude that the lemma holds.

Consider an assumption that the Computational Diffie-Hellman (CDH) assumption holds, and the hash function $H_2(\cdot)$ is a secure one-way hash function, then only Alice (sender) and Charlie (TTP) can deduce the message encryption key k which is used to encrypt the message m in an exemplary certified transaction protocol. Consider a proof, only Alice (sender) can produce a valid signature $(R_1,\sigma)$. In other words, the parameter $R_1$ is guaranteed to be generated by Alice, i.e., no one can impersonate Alice to send a valid parameter $R_1$. Since the hash function $H_2(\cdot)$ is a secure one-way hash function, the only way to deduce the message encryption key k is to deduce the value of the parameter $R_2$.

The CDH assumption implies that it is impossible to deduce a value for the parameter $R_2$ from $R_1$ and $y_s$. Therefore, no one except the person who knows r or $x_s$ can deduce the value of k. This means that only Alice (sender) and Charlie (TTP) can deduce the message encryption key k.

An exemplary certified transaction protocol can provide fairness. Consider a proof, based on the description presented in the above, when an exchange sub-protocol is executed normally, i.e., when Alice (sender) and Bob (receiver) are honest and the communication channel works, Bob receives the message sent by Alice, Alice receives a receipt from Bob, and Charlie (TTP) is not involved.

Also, if Alice and Bob are both honest, but the communication channel does not work during the execution of an exchange sub-protocol; Alice can invoke the dispute protocol to ask for assistance from Charlie (TTP) to complete the exchange. Therefore, fairness holds in these two cases. In other cases, an exemplary protocol can also provide fairness, i.e., Alice (sender) and Bob (receiver) cannot take advantage of each other in the process of execution of the protocol even if he or she behaves maliciously. Such cases can be classified as follows: (1) Alice is honest, but Bob is malicious; (2) Bob is honest, but Alice is malicious, and (3) Alice and Bob are both malicious.

Figure 8:
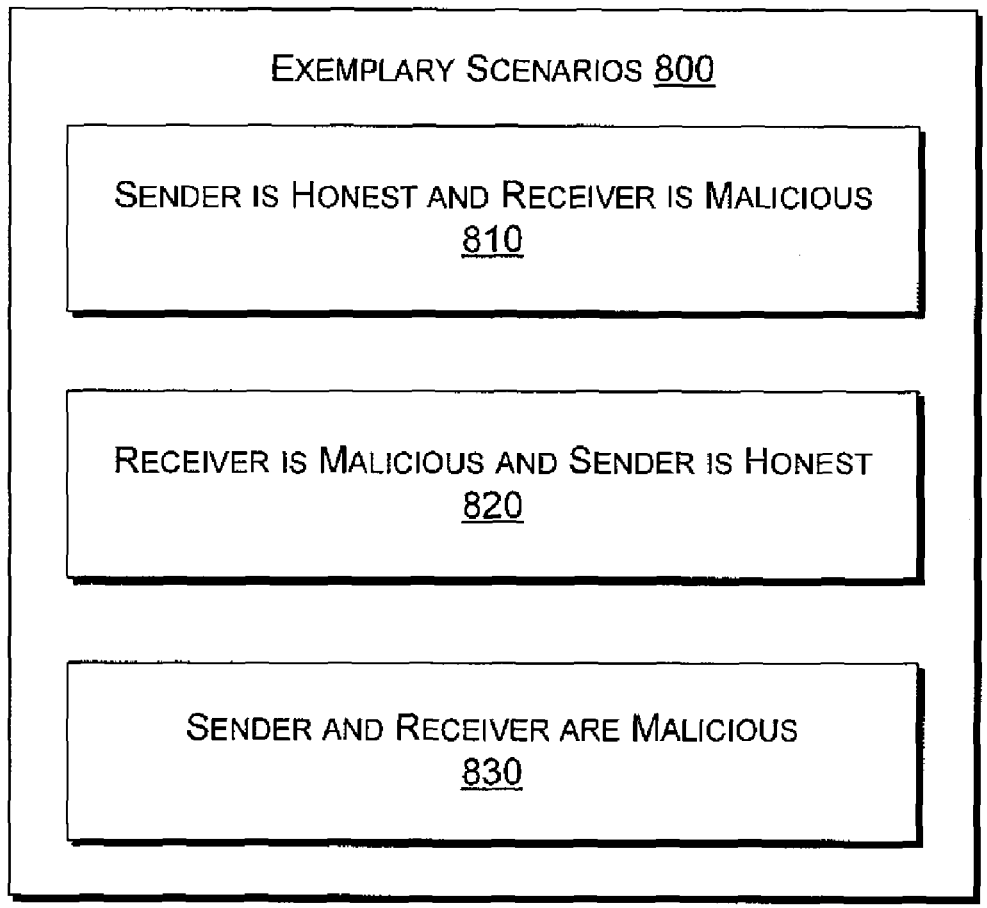
FIG. 8 is a block diagram of exemplary scenarios where disputes may arise in a transaction.

FIG. 8 shows a block diagram of three exemplary scenarios 800 that can be handled by a dispute protocol. A first scenario 810 involves an honest sender and a malicious receiver. A second scenario 820 involves a malicious sender and an honest receiver. A third scenario 830 involves a malicious sender and a malicious receiver.

Figure 9:
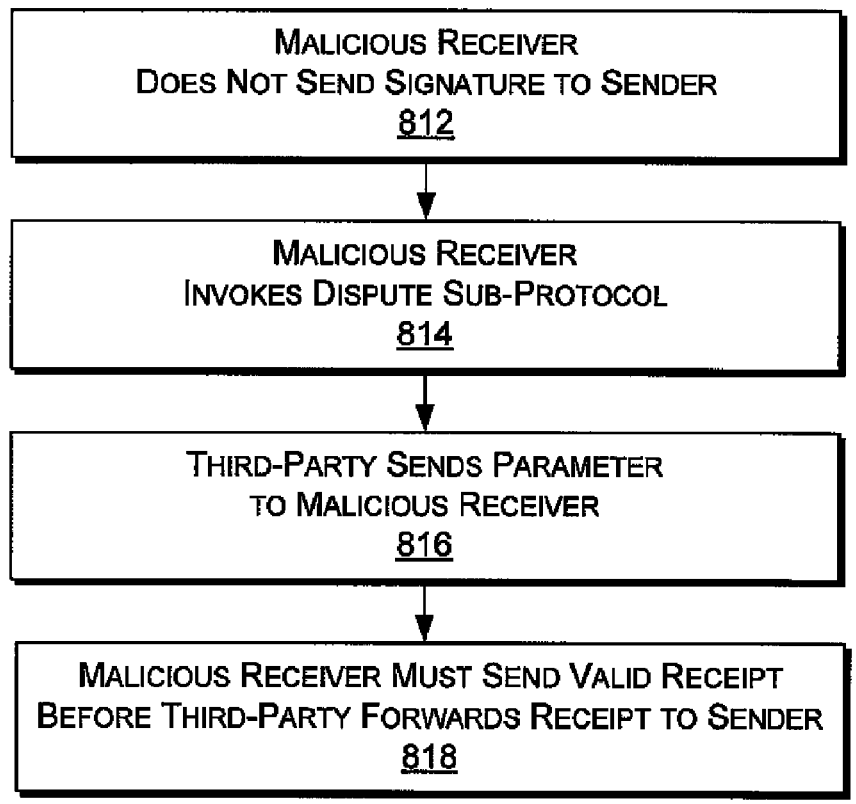
FIG. 9 is a block diagram of an exemplary dispute scenario that involves a malicious receiver.

FIG. 9 shows a block diagram of an example of the first scenario 810, a malicious receiver. To explain this example, consider Alice is the sender and honest while Bob is the receiver and malicious. Further consider that Charlie is a trusted third party. In this scenario, Bob aims to obtain the message m without sending his valid receipt $\sigma_B$ to Alice. According to an exemplary certified email protocol 200, Bob may cheat in the exchange sub-protocol 220 by not sending his valid receipt to Alice (e.g., per block 812). According to the protocol 200, however, Alice will not send the parameter $R_2$ to Bob in this situation. However, per blocks 814 and 816, Bob can obtain the parameter $R_2$ from Charlie by executing the dispute sub-protocol 230. But in this case security is ensured because Bob has to send his valid receipt to Charlie before Charlie forwards the parameter $R_2$ to Alice. Charlie also forwards the receipt to Alice in the dispute sub-protocol 230. Furthermore, only Alice can generate a valid signature $(R_1, \sigma)$. In conclusion, if Bob wants to receive the message m, per block 818, Bob has to send his valid receipt to Alice, directly or indirectly. Thus, the exemplary protocol 200 can provide fairness in the scenario 810.

FIG. 10 shows a block diagram of two examples 821, 823 of the second scenario 820, a malicious sender. To explain the examples 821, 823, consider Alice is the sender and malicious while Bob is the receiver and honest. Further consider that Charlie is a trusted third party.

In the examples 821, 823, Alice aims to obtain Bob's receipt $\sigma_B$ without sending the message m to Bob, or to make Charlie abort in dispute sub-protocol 230. In the protocol 200, Alice may cheat in either of two steps of the exchange sub-protocol 220.

In the example 821, per block 822, if Alice does not send the authorized data (e.g., $(C_A, R_1, R', Dsc_m, s_A)$ or other information that allows others to ensure that Alice is the sender) to Bob, per block 824, Bob will not send his valid receipt to Alice.

In the example, 823, if Alice does not send the right $(R_1, R')$ to Bob, Bob would send the valid receipt to Alice per block 826. In this context, "right" means that Charlie and Alice would result in the same symmetric encryption key k, and $R'=H(R_2)$ However, per block 828, Alice cannot use the received receipt from Bob to prove to others that Bob has received the right message m from her, which means the receipt Alice received is useless. Therefore Alice has to send the authorized and correct information (e.g., $(C_A, R_1, R', Dsc_m, s_A)$) to Bob in this step. In the latter one, if Alice sends invalid $R_2$ to Bob or does not sends $R_2$ to Bob, Bob can invoke the dispute sub-protocol to get m. If the received message m does not match its description, the receipt Alice obtains from Bob is useless since she cannot prove to others that Bob has received the right message m from her. In conclusion, our protocol can provide fairness in this case too.

An exemplary certified transaction protocol was compared with others to assess performance. In the context of optimistic certified email protocols, the others were based on public key cryptography technologies. Public key cryptography takes much longer time than symmetric key cryptography or secure hash functions. In public key cryptography, the most time-consuming operation is the modular exponentiation calculation. The ratio of the time taken for a modular exponentiation operation to the time taken for a single modular multiplication is linearly proportional to the exponent's bit length. As a result, a comparison can ignore single modular multiplications and other non-public key cryptography algorithms such as symmetric encryption, symmetric decryption, and hash function in a theoretical analysis of protocol efficiency for purposes of comparing an exemplary certified email protocol with other certified email protocols.

One comparison protocol is based on the ElGamal scheme and the Schnorr scheme (denoted as Wan05a). Another is based on RSA (denoted as Wan05b). An exemplary certified email protocol is compared with these two protocols in an efficiency comparison. In this comparison, EXP is used to denote the time taken by one modular exponentiation operation that ElGamal encryption scheme or the Schnorr scheme need. The term $EXP_{RSA}$ denotes the time taken by one modular exponentiation operation that RSA signature or RSA decryption needs, and $EV_{RSA}$ denotes the time taken by one modular exponentiation operation that RSA verification or RSA encryption needs. It is assumed that the tested exemplary protocol uses the same group G as the group in Wan05a, even though it is a multiplication group of a finite field or a finite rational point group over an elliptic curve.

TABLE 1

Comparison of time cost of exemplary protocol and others.

| | Wan05a | Wan05b | Ex. P. |
|---|---|---|---|
| Step 1 | 3EXP | $1EXP_{RSA} + 1EV_{RSA}$ | 2EXP |
| Step 2 | $2EXP + 1SGN_B$[1] $1EV_{RSA} + 1SGN_B$ | $2EXP + 1SGN_B$ | |
| Step 3 | $1VER_B$[2] $1VER_B$ | $1VER_B$ | |
| Total | $5EXP + 1SGN_B + 1VER_B$ | $1EXP_{RSA} + 2EV_{RSA} + 1SGN_B + 1VER_B$ | $4EXP + 1SGN_B + 1VER_B$ |
| Prove | 2EXP | $1EV_{RSA}$ | 1Pairing[3] (or 1EXP[4]) |
| Dispute | $3EXP + 1VER_B$ | $1EXP_{RSA} + 1EV_{RSA} + 1VER_B$ | $3EXP + 1VER_B$ |

Where:
[1]time taken by Bob's signature algorithm;
[2]time taken by Bob's verification algorithm;
[3]time taken by a pairing computation;
[4]in this case, Alice can only prove to Charlie.

Table 1 shows the time cost of an exemplary protocol (Ex. P.) as well as the Wan05a and Wan05b protocols. For purposes of this comparison, the time costs in the setup phase and the certificate verification process are ignored. From the information in Table 1, the exemplary protocol saves one modular exponentiation operation in the exchange sub-protocol as compared with Wan05a. For example, if Alice (sender) needs to prove to only the TTP that she has sent the message m to Bob (receiver), one protocol saves one modular exponentiation operation in the proving process. If Alice needs to prove to others, then the exemplary protocol needs one pairing operation, which is typically slower than the two modular exponentiation operations needed in the Wan05a protocol. A comparison of the exemplary protocol with Wan05b is more complex due to different public key cryptography systems used in the two protocols. The Wan05b protocol uses RSA while the ElGamal encryption scheme and the Schnorr signature scheme are used in the Wan05a protocol and the exemplary protocol is based on a discrete logarithm problem, and, as a result, can take the advantage of Elliptic Curve Cryptography (ECC) which uses much shorter keys than, and is therefore much faster than RSA for the same security level. For example: RSA with 2048 bits of key length has the same security level as ECC with 224 bits of key length, and ECC-224 is 7.8 times faster than RSA-2048 in full length modular exponentiation. Therefore, the exemplary protocol is also much more efficient than the Wan05b protocol. In conclusion, the exemplary protocol is more efficient than both the Wan05a and Wan05b protocols, which were considered two of the most efficient certified email protocols with an off-line TTP.

As described herein, various exemplary techniques allow for construction of an exemplary certified transaction protocol. While various examples pertain to email, other such exemplary techniques may be applied to other types of transactions. An exemplary protocol is based on the authorized Diffie-Hellman key agreement. A comparison shows that, for email transactions, an exemplary protocol is more efficient than conventional certified email protocols in terms of the number of exponentiations and communication data. Due to its efficiency, an exemplary certified email protocol is suitable for use in applications that execute in a distributed environment (e.g., distributed applications, Web 2.0 applications, etc.).

As already explained, a protocol over a network is asynchronous by nature. Cheating can easily occur in some steps of a sequential procedure if there is no trusted party present. As described herein, an exemplary certified transaction protocol enables a fair exchange of information (e.g., a message) and an undeniable receipt between two "untrusted" parties over a network such as the Internet without a Trusted Third Party (TTP). In such an exemplary scheme, neither of the two parties involved in an exchange can cheat to gain favor. Such a fair exchange protocol has many potential applications such as a mobile agent passes from one host to another, a system to encourage users to share or distribute contents such as Ads with or to others by giving the contributors receipts which can be later converted into awards.

An exemplary protocol for transactions empowers users to share information. For example, such a protocol can be implemented in a distributed environment and provide security measures that encourage users in a distributed environment (e.g., Web users) to share media such as photos, movies, songs, etc. Such a protocol can be used within a research environment, a legal environment, a reward environment, etc. For example, where research results are important to regulatory review, the regulatory agency may require that transactions occur using an exemplary protocol with an off-line TTP.

In legal matters, court filings and/or filings between parties in a legal matter may occur using an off-line TTP. In some instances, the court (e.g., the clerk of the court) may act as a TTP to ensure that parties to a litigation exchange emails, court filings, evidence, etc.

In Web advertising, hits, payments or rewards may be checked where necessary using an exemplary protocol with a TTP. For example, an advertising scheme may encourage people to share content and ads with others. In the Alice (sender) and Bob (receiver) context, when Alice sends content with an ad to Bob then, according to the scheme, Bob receives the content, views the ad and sends a receipt (e.g., signature) to Alice. Once Alice has the receipt, she can present the receipt to claim a reward for spreading the ad.

An exemplary protocol may be used with content such as a YouTube video (e.g., a video distribution site on the Internet) where a certified email directs people to the content along with advertising. For example, Alice has content from YouTube and desires to send it to Bob. So, in an exemplary certified scheme Alice sends the content to Bob and Bob sends a receipt to Alice. Alice then sends the receipt to YouTube or an associated party (e.g., an advertiser) and collects a reward. In turn, Bob may send the content to another party (e.g., Mark) via a certified email and receive a receipt in return. If a dispute arises, according to an exemplary protocol, a TTP can determine who is cheating.

In various aforementioned examples, efficiency can help in speeding distribution of content, which can help content reach as many people as possible in the shortest amount of time.

An exemplary protocol dictates a sequential exchange between two parties in a manner that guarantees a mechanism to resolve disputes. In such an example, the parties may be two servers that periodically make exchanges. For example, Server A can send information to an agent of Server B and when Server B receives the information, it can send a receipt to Server A. Disputes between the servers can be resolved using a TTP.

While various examples refer to parties to a transaction as "untrusted", an exemplary protocol may be used for "trusted" parties where communication falters or where other issues arise that are amenable to resolution by a TTP.

Figure 11:
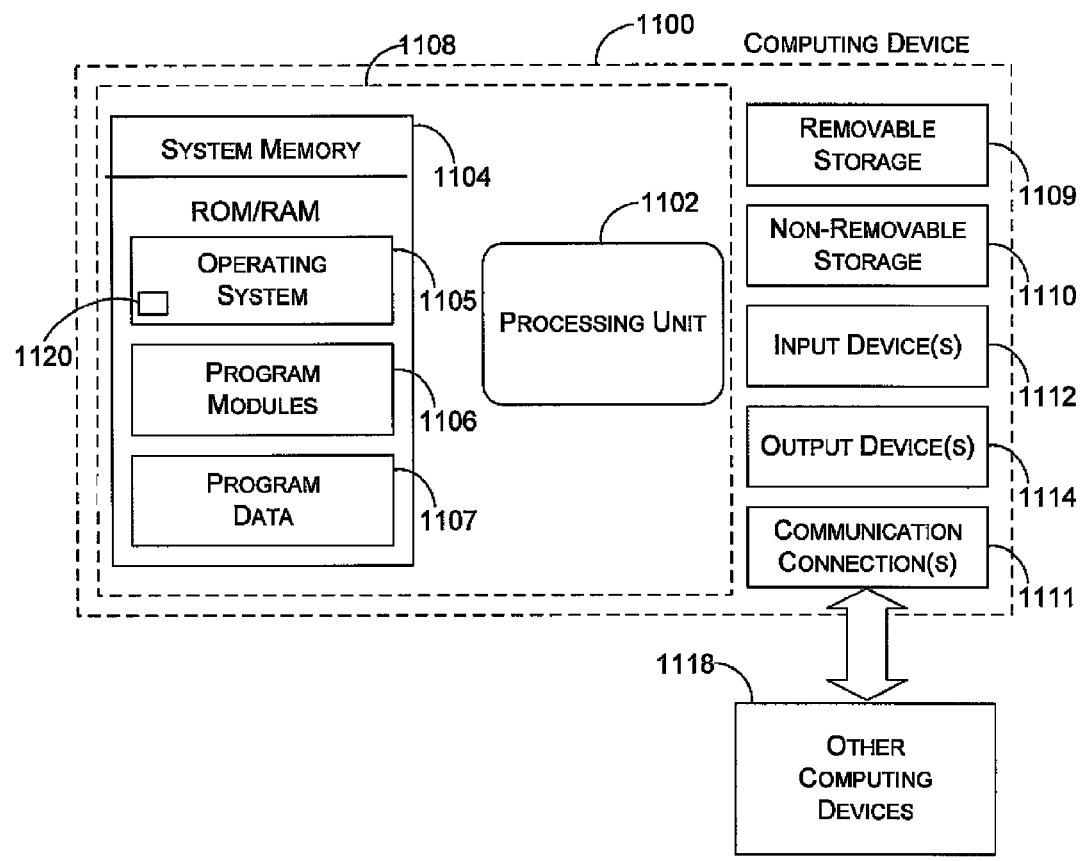
FIG. 11 is a block diagram of an exemplary computing device.

FIG. 11 illustrates an exemplary computing device 1100 that may be used to implement various exemplary components and in forming an exemplary system. For example, the servers and clients of the system of FIG. 1 may include various features of the device 1100.

In a very basic configuration, computing device 1100 typically includes at least one processing unit 1102 and system memory 1104. Depending on the exact configuration and type of computing device, system memory 1104 may be volatile (such as RAM), non-volatile (such as ROM, flash memory, etc.) or some combination of the two. System memory 1104 typically includes an operating system 1105, one or more program modules 1106, and may include program data 1107. The operating system 1105 include a component-based framework 1120 that supports components (including properties and events), objects, inheritance, polymorphism, reflection, and provides an object-oriented component-based application programming interface (API), such as that of the .NET™ Framework manufactured by Microsoft Corporation, Redmond, Wash. The device 1100 is of a very basic configuration demarcated by a dashed line 1108. Again, a terminal may have fewer components but will interact with a computing device that may have such a basic configuration.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by removable storage 1109 and non-removable storage 1110. Computer storage media may include volatile and nonvolatile, removable and non-removable media implemented in any method or technology for storage of information, such as computer readable instructions, data structures, program modules, or other data. System memory 1104, removable storage 1109 and non-removable storage 1110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of device 1100. Computing device 1100 may also have input device(s) 1112 such as keyboard, mouse, pen, voice input device, touch input device, etc. Output device(s) 1114 such as a display, speakers, printer, etc. may also be included. These devices are well know in the art and need not be discussed at length here.

Computing device 1100 may also contain communication connections 1116 that allow the device to communicate with other computing devices 1118, such as over a network (e.g., consider the aforementioned network 150 of FIG. 1). Communication connections 1116 are one example of communication media. Communication media may typically be embodied by computer readable instructions, data structures, program modules, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable memory storing computer-executable instructions that, when executed, cause one or more processors to implement protocols for a two-party transaction, the protocols comprising:
   a setup sub-protocol that comprises using an authorized Diffie-Hellman key agreement to share an encryption key between a sending party and a trusted third party that resolves transaction disputes between the sending party and a receiving party;
   an exchange sub-protocol that comprises sending a message description, a hash of the encryption key, a certificate, and a message encrypted by the encryption key from the sending party to the receiving party, sending a receipt from the receiving party to the sending party during the two-party transaction, and sending the encryption key from the sending party to the receiving party in response to receiving the receipt at the sending party; and
   a dispute sub-protocol that comprises a dispute resolution mechanism to resolving disputes between the sending party and the receiving party by the trusted third party at least due to a discrepancy between the hash and an additional hash of the encryption key.

2. The one or more computer-readable memory of claim 1, wherein the two-party transaction comprises an email transaction.

3. The one or more computer-readable memory of claim 1, wherein the message is an encrypted message that is encrypted using the encryption key.

4. The one or more computer-readable memory of claim 1, wherein the message description is a hash of the message.

5. The one or more computer-readable memory of claim 2, wherein the exchange sub-protocol further comprises sending decryption information that provides the encryption key from the sending party to the receiving party for decrypting the message in exchange for the receipt.

6. The one or more computer-readable memory of claim 5, wherein the encryption key is a symmetric encryption key.

7. The one or more computer-readable memory of claim 1, wherein the trusted third party is to further resolve disputes between the sending party and the receiving party further due to one of sending of an invalid certificate, sending of an invalid receipt, a discrepancy between the message and the message description, or an abortion of the exchange sub-protocol.

8. The one or more computer-readable memory of claim 1, wherein the message is an email message.

9. The one or more computer-readable memory of claim 1, wherein the trusted third party is different from a certification authority that issued the certificate.

10. The one or more computer-readable memory of claim 1, wherein the setup sub-protocol includes registering a public key with a certification authority in exchange for the certificate.

11. The one or more computer-readable memory of claim 2, wherein the trusted third party resolves disputes between the sending party and the receiving party by at least one of providing decryption information for an email that is sent by the sending party to the receiving party during the email transaction or forcing the receiving party to send a valid receipt to the sending party in exchange for the email.

12. The one or more computer-readable memory of claim 1, wherein the sending party and the receiving party transact via a distributed application operating in a distributed computing environment.

13. The one or more computer-readable memory of claim 1, wherein the setup sub-protocol further comprises binding a public key of the sending party to a certificate for the sending party.

14. The one or more computer-readable memory of claim 13, wherein the trusted party is an off-line party to the two-party transaction between the sending party and the receiving party.

15. The one or more computer-readable memory of claim 1, wherein the setup sub-protocol comprises a modified Schnorr signature scheme for generating a signature for the receiving party that is included in the receipt.

16. A computer-implemented method, comprising:
   sharing an encryption key that is known to the sending party with a trusted third party using an authorized Diffie-Hellman key agreement, the encryption key for resolving transaction disputes between the sending party and a receiving party;
   sending a message description, a hash of the encryption key, a certificate, and an encrypted message that is encrypted by the encryption key to the receiving party;
   receiving a receipt from the receiving party and in response to the receiving, sending decryption information to the receiving party, wherein the decryption information provides the encryption key for decrypting the encrypted message; and receiving an indication that the receiving party sent a dispute resolution request to the trusted third party, the dispute resolution request being sent in response to detecting a discrepancy between the hash and an additional hash of the encryption key performed by the receiving party.

17. The method of claim 16, wherein the trusted party is an off-line party to a two-party transaction between the sending party and the receiving party.

18. A method, implemented at least in part by a computing device, the method comprising:

under control of a computing device comprising one or more processors, receiving a message description, a hash of an encryption key, an encrypted message, and a certificate from a sending party at a receiving party, the encrypted message being encrypted based at least on the encryption key, the encryption key being shared between the sending party and a trusted third party using an authorized Diffie-Hellman key agreement prior to a transaction dispute between the sending party and the receiving party;

sending a receipt from the receiving party to the sending party during a two-party transaction, and receiving the encryption key from the sending party in exchange for the receipt; and sending a dispute resolution request from the receiving party to the trusted third party in response to detecting a discrepancy between the hash and an additional hash of the encryption key.

19. The method of claim 18, further comprising receiving a decryption key from the trusted third party at the receiving party when the receiving party provides the receipt to the trusted third party during a dispute resolution.

20. The method of claim 19, further comprising decrypting the message at the receiving party using the decryption key from the trusted third party.

* * * * *